(12) United States Patent
Zhong et al.

(10) Patent No.: US 10,211,015 B2
(45) Date of Patent: Feb. 19, 2019

(54) DIMMER SWITCH SYSTEM WITH SECONDARY SWITCH

(71) Applicant: EATON CORPORATION, Cleveland, OH (US)

(72) Inventors: Kevin Zhong, Putuo District (CN); Saivaraprasad Murahari, Peachtree, GA (US); Ahmed El-Gayyar, Senoia, GA (US)

(73) Assignee: EATON INTELLIGENT POWER LIMITED, Dublin (IE)

(*) Notice: Subject to any disclaimer, the term of this patent is extended or adjusted under 35 U.S.C. 154(b) by 158 days.

(21) Appl. No.: 15/477,261

(22) Filed: Apr. 3, 2017

(65) Prior Publication Data
US 2018/0286611 A1   Oct. 4, 2018

(51) Int. Cl.
*H01H 47/00* (2006.01)
*H05B 37/02* (2006.01)

(52) U.S. Cl.
CPC ....... *H01H 47/007* (2013.01); *H05B 37/0209* (2013.01)

(58) Field of Classification Search
CPC .................. H05B 37/0209; H01H 47/007
See application file for complete search history.

(56) References Cited

U.S. PATENT DOCUMENTS

| | | | | |
|---|---|---|---|---|
| 2006/0250093 A1* | 11/2006 | Kumar | ............... | H05B 37/0209 315/209 R |
| 2007/0007826 A1* | 1/2007 | Mosebrook | ........ | H05B 37/0209 307/139 |
| 2007/0193863 A1* | 8/2007 | Wu | ........................ | H01H 3/161 200/61.72 |
| 2007/0296347 A1* | 12/2007 | Mosebrook | ........ | H05B 37/0209 315/209 SC |
| 2016/0143115 A1* | 5/2016 | Zhang | ................ | H05B 37/0209 315/294 |
| 2017/0118811 A1* | 4/2017 | Dadashnialehi | ... | H05B 33/0815 |

* cited by examiner

*Primary Examiner* — Jared Fureman
*Assistant Examiner* — Duc M Pham
(74) *Attorney, Agent, or Firm* — Eckert Seamans (57) ABSTRACT

A dimmer switch system electrically connected between a power source and a load includes a primary housing including a primary switch actuatable by a user, a processor structured to change a state of the dimmer switch based on actuation of either the primary switch or the secondary switch, and a secondary switch isolation circuit. The dimmer switch system also includes a secondary housing including a secondary switch actuatable by the user and being electrically connected to the power source. The secondary switch isolation circuit is electrically connected between the secondary switch and the processor, the secondary switch isolation circuit including an optocoupler and being structured to isolate the processor from the power source and to provide a signal to the processor based on a state of the secondary switch.

20 Claims, 6 Drawing Sheets

DIMMER SWITCH SYSTEM WITH SECONDARY SWITCH

BACKGROUND

Field

The disclosed concept relates generally to switches, and in particular, to dimmer switches. The disclosed concept also relates to dimmer switch systems including dimmer switches.

Background Information

Dimmer switches provide a dimming function for loads such as lights. Some dimmer switches also provide an on/off switch so that the load can be turned on or off rather than dimming the load. Additional functionality of dimmer switch is desirable. However, providing additional functionality often comes at the cost of additional components and complexity. It would be desirable to provide additional functionality to dimmer switches while minimizing the cost and complexity of components to provide such additional functionality.

There is thus room for improvement in dimmer switches, and in dimmer switch systems including dimmer switches.

SUMMARY

These needs and others are met by embodiments of the disclosed concept in which a dimmer switch system includes a secondary switch and a dimmer switch with a secondary switch isolation circuit including an optocoupler and being structured to isolate a processor from a power source and to provide a signal to the processor based on a state of the secondary switch.

In accordance with one aspect of the disclosed concept, a dimmer switch system electrically connected between a power source and a load comprises: a primary housing including: a primary switch actuatable by a user; a processor structured to change a state of the dimmer switch based on actuation of either the primary switch or the secondary switch; and a secondary switch isolation circuit; a secondary housing including: a secondary switch actuatable by the user and being electrically connected to the power source, wherein the secondary switch isolation circuit is electrically connected between the secondary switch and the processor, the secondary switch isolation circuit including an optocoupler and being structured to isolate the processor from the power source and to provide a signal to the processor based on a state of the secondary switch.

In accordance with another aspect of the disclosed concept, a dimmer switch comprises: a primary switch actuatable by a user; an input structured to be electrically connected to a secondary switch actuatable by the user, the secondary switch being electrically connected to the power source; a processor structured to change a state of the dimmer switch based on actuation of either the primary switch or the secondary switch; and a secondary switch isolation circuit electrically connected between the secondary switch and the processor, the secondary switch isolation circuit including an optocoupler and being structured to isolate the processor from the power source and to provide a signal to the processor based on a state of the secondary switch.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts are "coupled" or "connected" together shall mean that the parts are joined together either directly or joined through one or more intermediate parts. As employed herein, the statement that two or more parts are "directly connected" shall mean that the parts are joined together directly with no intermediate parts.

As employed herein, the term "processor" shall mean a programmable analog and/or digital device that can store, retrieve, and process data; a microprocessor; a microcontroller; a microcomputer; a central processing unit; or any suitable processing device or apparatus.

Figure 1:
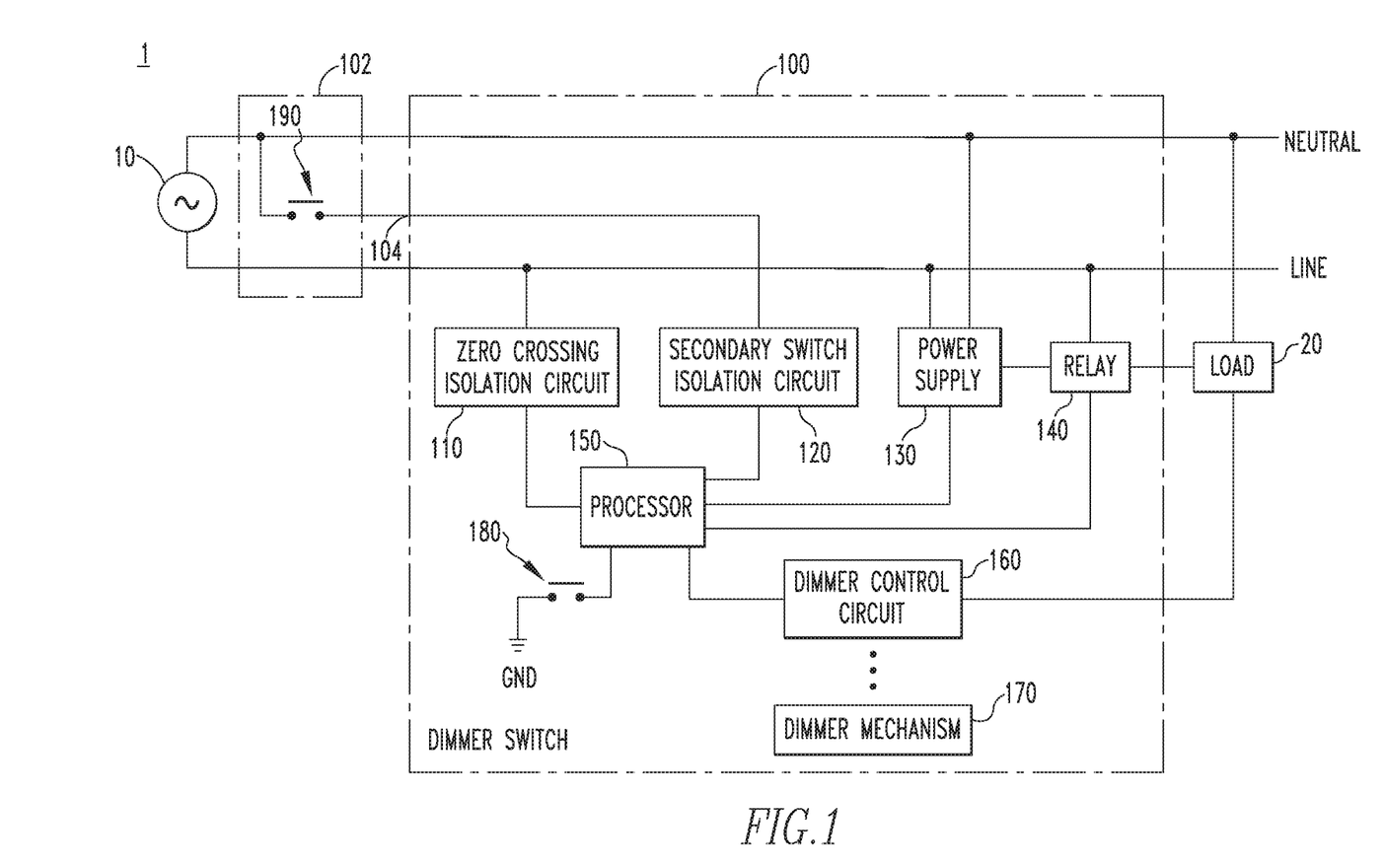
FIG. 1 is a schematic diagram of an electrical system including a dimmer switch system in accordance with an example embodiment of the disclosed concept.
Figure 7:
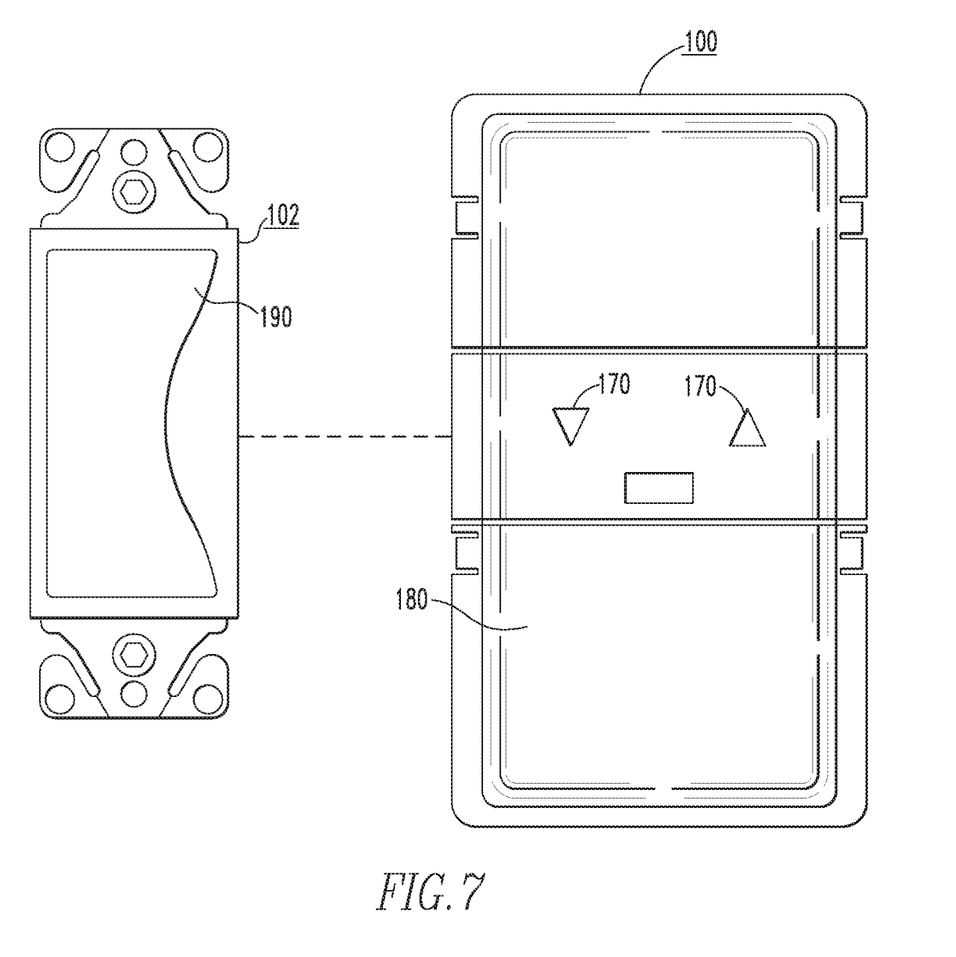
FIG. 7 is an external view of a dimmer switch system in accordance with an example embodiment of the disclosed concept.

FIG. 1 is a schematic diagram of an electrical system 1 including a dimmer switch system in accordance with an example embodiment of the disclosed concept. The dimmer switch system includes dimmer switch 100 and a secondary switch housing 102. The dimmer switch 100 and the secondary switch housing 102 are electrically connected and may be provided in different housings. For example, the components of the dimmer switch 100 may be provided in a primary housing and the secondary switch housing 102 and its components may be a secondary housing. An example is shown in FIG. 7. The dimmer switch 100 and the secondary housing 102 are electrically connected between a power source 10 and a load 20 via line and neutral conductors. In some example embodiments of the disclosed concept, the power source 10 is a 120 Vac or 277 Vac power source. Also, in some example embodiments of the disclosed concept, the load 20 is a dimmable light.

The dimmer switch 100 includes a primary switch 180 and the secondary housing 102 includes a secondary switch 190. Both the primary switch 180 and the secondary switch 190 are actuatable by a user. Actuating the primary switch 180 or the secondary switch 190 causes the dimmer switch to change it state. That is, if the dimmer switch 100 is in the on state (i.e., providing power to the load 20), actuating either of the primary and secondary switches 180,190 will cause the dimmer switch 100 to switch to the off state (i.e., stop providing power to the load 20). Similarly, actuating either of the primary and secondary switches 180,190 when the dimmer switch 100 is in the on state will cause it to change to the off state. The dimmer switch 100 includes a processor 150 that changes the state of the dimmer switch 100 based on actuation of either the primary switch 180 or the secondary switch 190.

The dimmer switch 100 also includes a dimmer mechanism 170. The dimmer mechanism 170 may be operated by a user to control dimming of the load 20. In some example embodiments of the disclosed concept, the dimmer mechanism 170 is a slider. However, it will be appreciated by those having ordinary skill in the art that the dimmer mechanism 170 may take any of several different forms without departing from the scope of the disclosed concept. For example and without limitation, in some example embodiments of the disclosed concept, the dimmer mechanism 170 is a pair of switches that may be operated to increase or lessen dimming.

A relay 140 is included in the dimmer switch 100. The relay 140 is electrically connected between the power source 10 and the load 20. In some example embodiments of the disclosed concept, the relay 140 is electrically connected between a line conductor and the load 20. The relay 140 is able to be electrically controlled to open (i.e., electrically disconnect the load 20 from the power source 10) and to close (i.e., electrically connect the load 20 and the power source 10). Closing the relay 140 corresponds with changing the dimmer switch 100 to the on state and opening the relay 140 corresponds with changing the dimmer switch 100 to the off state.

The dimmer switch 100 also includes the processor 150. The processor 150 is electrically connected to the relay 140 and is structured to electrically control the relay 140 to open and close. The dimmer switch 100 is structured such that when one of the primary and secondary switches 180,190 is actuated, the processor 150 controls the relay 140 to change its state (i.e., change from open to closed or from closed to open).

The dimmer switch 100 further includes a power supply 130. The power supply 130 is electrically connected to the power source 10. The power supply 130 is structured to convert AC power from the power source 10 to DC power usable by the dimmer switch 100. DC power from the power supply 130 may be used to power components of the dimmer switch 100 such as, without limitation, the processor 150, the relay 140, and other components.

A dimmer control circuit 160 is also included in the dimmer switch 100. The dimmer control circuit 160 is electrically connected to the load 20 and is structured to provide the dimming function. The dimmer control circuit 160 provides the dimming function based on the operation of the dimmer mechanism 170 by the user. That is, when the user actuates the dimmer mechanism 170 to dim the load, the dimmer control circuit 160 implements the dimming function in accordance with the user's input.

The primary switch 180 is electrically connected between an input of the processor 150 and ground GND. Closing the primary switch 180 pulls the input of the processor 150 to ground GND. The processor 150 is structured to change a state of the dimmer switch 100 (i.e., from on to off or off to on) based on actuation of the primary switch 180.

One end of the secondary switch 190 is electrically connected to the neutral conductor and the other end of the secondary switch 190 is electrically connected to a secondary switch isolation circuit 120. In some example embodiments of the disclosed concept, the dimmer switch 100 includes an input 104 to which the secondary switch 190 may be electrically connected. An electrical connection between the input 104 and the secondary switch isolation circuit 120 would then complete the electrical connection between the secondary switch 190 and the secondary switch isolation circuit 120. The power carried on the neutral conductor is power from the power source 10 and is not suitable for input to the processor 150. The secondary switch isolation circuit 120 is structured to isolate the processor 150 from the power source 10 and to output a signal suitable for use by the processor 150 based on the state of the secondary switch 190.

Figure 2:
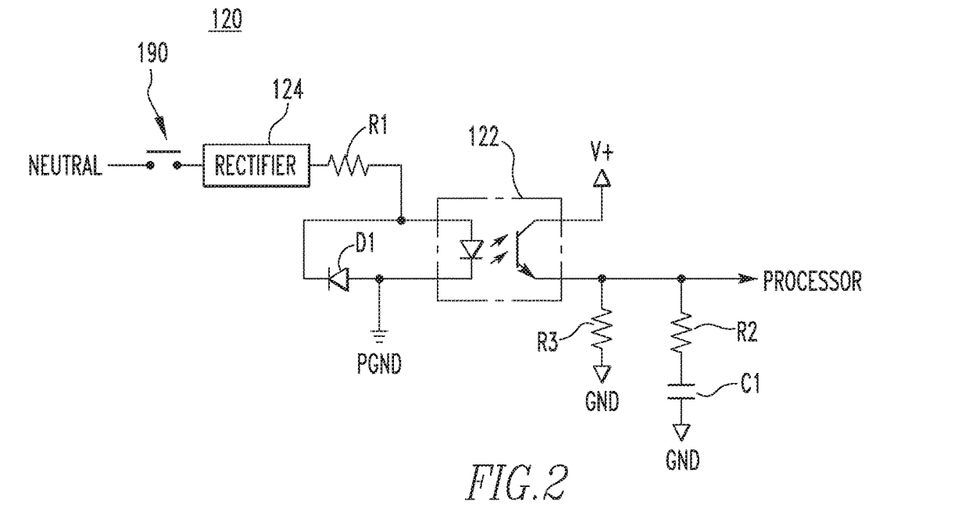
FIG. 2 is a circuit diagram of a secondary switch isolation circuit in accordance with an example embodiment of the disclosed concept.

A circuit diagram of the secondary switch coupling circuit 120 in accordance with an example embodiment of the disclosed concept is shown in FIG. 2. As shown in FIG. 2, one end of the secondary switch 190 is electrically connected to neutral conductor. The second end of the secondary switch 190 is electrically connected to a rectifier 124. The rectifier 124 is structured to half-wave rectify power. The output of the rectifier 124 is electrically connected to an input resistor R1. The input resistor R1 is electrically connected between the secondary switch 190 and the input of an optocoupler 122. The output of the optocoupler 122 is electrically connected to an input of the processor 150. The output of the optocoupler 122 is also electrically connected to a resistor R2 and capacitor C1 electrically connected in series between the output of optocoupler 122 and ground GND.

The dimmer switch 100 has multiple grounds. The ground GND is a reference ground provided by the power supply 130 for reference to the DC power provided by the power supply 130. The dimmer switch 100 also has a power ground PGND. The power ground PGND is a reference ground for reference to the AC power provided by the power source 10. The optocoupler 122 also receives DC power from the power supply.

A diode D1 is also electrically connected to the input of the optocoupler 122. The diode D1 provides input protection for the optocoupler 122. The power provided by the power source 10 via the neutral conductor is AC power. When the secondary switch 190 is closed, the power from the power source 10 is half-wave rectified by the rectifier 124 so that the input to the optocoupler 122 is a positive half-wave AC signal. Normally, the corresponding output of the optocoupler 122 would be a square-wave corresponding to the AC signal. However, the resistor R2 and capacitor C1 electrically connected to the output of the optocoupler 122 smooth the output so that the output of the optocoupler 122 is a rough equivalent of a DC signal.

Figure 3:
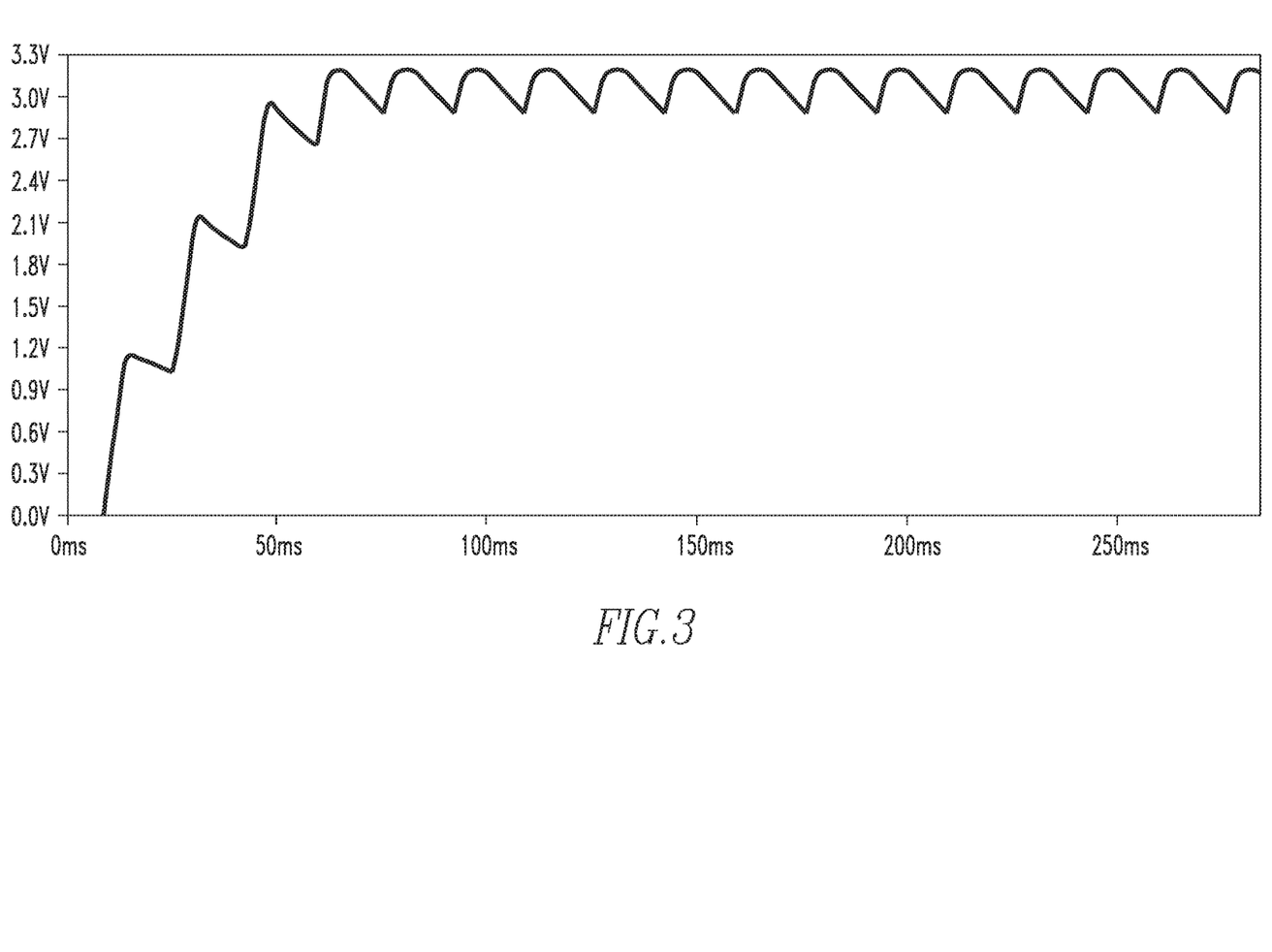
FIGS. 3 and 4 are charts of outputs of the secondary switch isolation circuit of FIG. 2.
Figure 4:
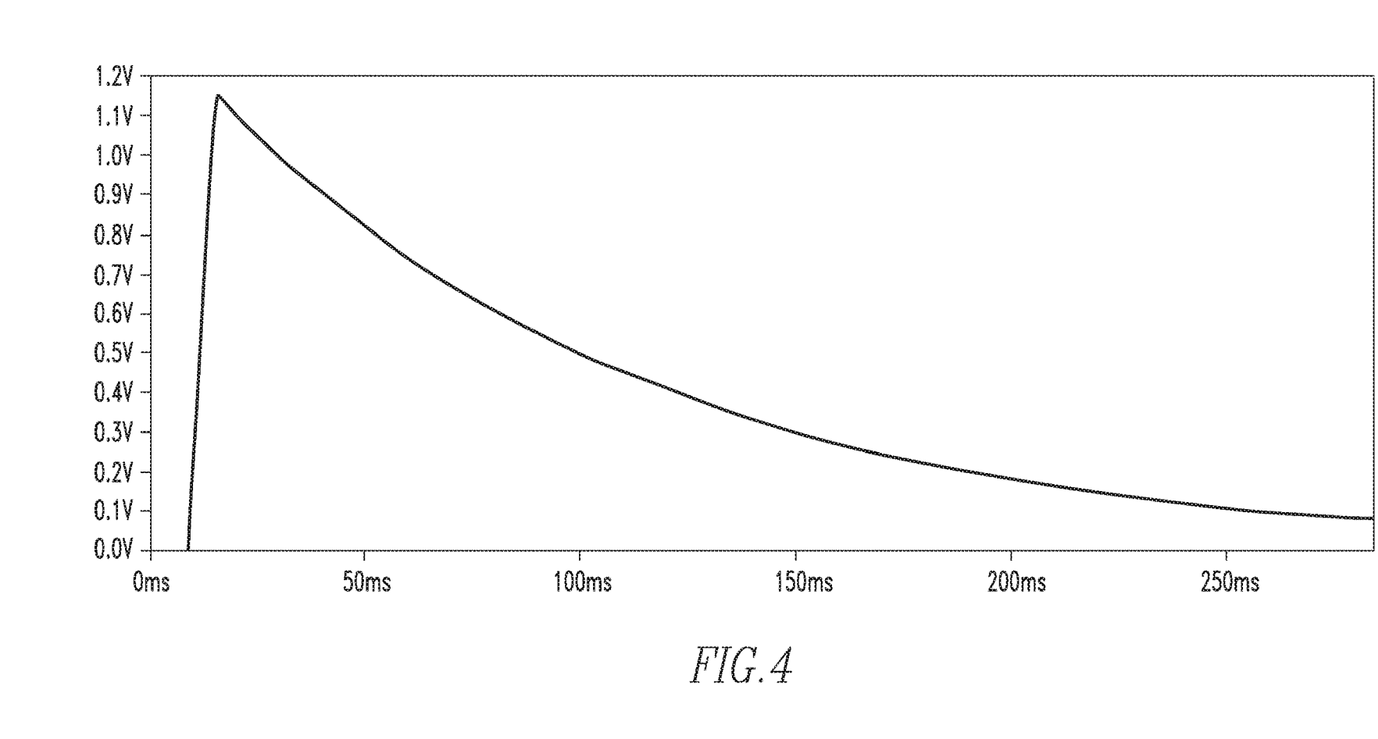

FIGS. 3 and 4 are charts showing the output of the optocoupler 122. The output of the optocoupler 122 is the signal provided by the secondary switch isolation circuit 120 to the processor 150. In FIG. 3, the secondary switch 190 is closed and in FIG. 4, the secondary switch 190 is open. When the secondary switch 190 is closed, as is shown in FIG. 3, the signal provided to the processor 150 is in the high state. In some example embodiments of the disclosed concept, the signal provided to the processor 150 maintains a voltage in a range of about 2.7-3.3V when in the high state. In some example embodiments of the disclosed concept, the signal reaches the high state within less than 100 ms after the secondary switch 190 is closed, as is shown, for example, in FIG. 3.

When the secondary switch 190 is opened, the signal provided to the processor 150 is in the low state. In some example embodiments of the disclosed concept, the signal provided to the processor 150 has a voltage of less than 1V when in the low state. In some example embodiments of the disclosed concept, the signal reaches the low state within less than 50 ms after the secondary switch 190 is closed.

It will be appreciated by those having ordinary skill in the art that the voltages associated with the high and low states of the signal provided to the processor 150 by the secondary switch isolation circuit 120 may be modified without departing from the scope of the disclosed concept. It will also be appreciated by those having ordinary skill in the art that the signal provided to the processor 150 by the secondary switch isolation circuit 120 is suitable for use by the processor 150 while the power provided by the power source 10 is not. It will also be appreciated by those having ordinary skill in the art that the time taken for the signal to reach the high or low state after actuation of the secondary switch 190 may be modified without departing from the scope of the disclosed concept. An instantaneous change in states of the signal is not possible, but the dimmer switch 100 is more responsive to actuation of the secondary switch 100 as the time for the signal to change states becomes shorter.

The output of the optocoupler 122 is suitable for use by the processor 150. The processor 150 is structured to recognize the change in states of the secondary switch 190 based on the change in states of the signal output from optocoupler 122. For example, the processor 150 may recognize that the state of the secondary switch has changed when the output of the optocoupler 122 changes from a 2.7-3.3V signal (i.e., a high state of the signal) to a signal having a voltage less than 1V (i.e., a low state of the signal). The processor 150 may thus monitor the states of both the primary switch 180 and the secondary switch 190 so as to control the dimmer switch 100 to change its state (i.e., turn on or turn off) when the state of either the primary switch 180 or the secondary switch 190 is changed.

In some example embodiments of the disclosed concept, the resistor R2 has a resistance of about 100Ω and the capacitor C1 has a capacitance of about 10 μF. This resistance and capacitance maintain the output of the optocoupler 122 in a range usable by the processor when the secondary switch 190 is closed and discharge quickly when the secondary switch 190 is opened. In other words, the selected values of the resistor R2 and capacitor C1 provide operability of the secondary switch isolation circuit 120 and responsiveness of the dimmer switch 100 to actuation of the secondary switch 190. It will be appreciated that other values may be selected for the resistor R2 and capacitor C1 without departing from the scope of the disclosed concept. In some example embodiments of the disclosed concept, the input resistor R1 has a resistance of about 200 kΩ.

The secondary switch isolation circuit 120 may also include a resistor R3 electrically connected between the output of the optocoupler 122 and ground GND. In some example embodiments of the disclosed concept, the resistor R3 may have a resistance of about 10 kΩ.

Through the optocoupler 122, the secondary switch 190 provides isolation between the power source 10 and the processor 150. The power as carried on the neutral conductor is not usable by the processor 150 and could damage the processor 150 if the neutral conductor were to be directly connected to the processor 150.

The power provided from the power source 10 is periodic so monitoring when the power from the power source 10 crosses 0V (i.e., the zero-crossing) can provide the processor 150 with useful information that can be used in functions such as load control, synchronization, calibration, etc. However, the power from the power source 10 cannot be provided directly to the processor 150 for monitoring the zero-crossings.

Figure 5:
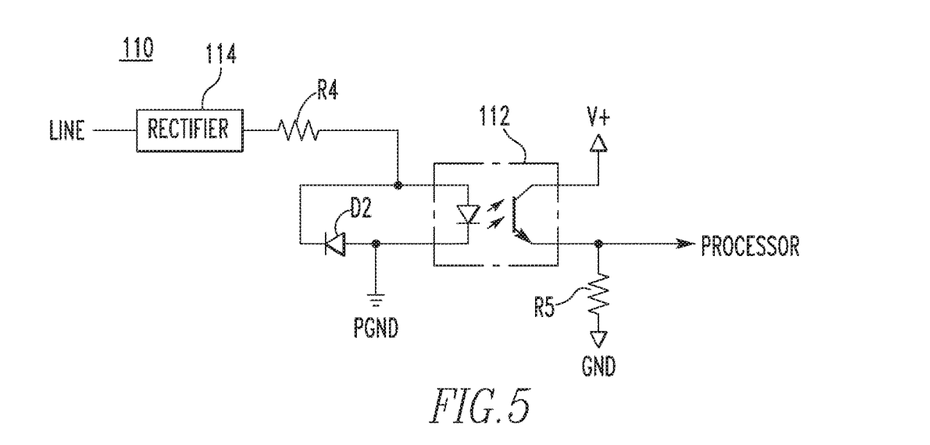
FIG. 5 is a circuit diagram of a zero crossing isolation circuit in accordance with an example embodiment of the disclosed concept.

Referring again to FIG. 1, a zero-crossing isolation circuit 110 is electrically connected between the line conductor and the processor 150. FIG. 5 is a circuit diagram of the zero-crossing isolation circuit 110 in accordance with an example embodiment of the disclosed concept. The input of the zero-crossing isolation circuit 110 is electrically connected to the LINE conductor. The zero-crossing isolation circuit 110 includes a rectifier 114, an optocoupler 112, an input resistor R4, a diode D2, and a second resistor R5.

The rectifier 114 is electrically connected to the LINE conductor. The rectifier 114 is structured to half-wave rectify power. The input resistor R4 is electrically connected between the rectifier 114 and an input of the optocoupler 112. An output of the optocoupler 112 is electrically connected to an input of the processor 150. The optocoupler 112 also receives DC power from the power supply 130. The second resistor R5 is electrically connected between the output of the optocoupler 112 and ground GND.

The diode D2 is electrically connected to the input of the optocoupler 112. The diode D2 provides input protection for the optocoupler 112. The power provided by the power source 10 to the zero-crossing isolation circuit 110 via the line conductor is AC power. The rectifier 114 half-wave rectifies the power received from the power source 10 so that the input to the optocoupler 112 is a positive half-wave AC signal. The output of the optocoupler 112 is a square-wave corresponding to the positive half-wave AC signal. The processor 150 is able to use the square-wave at the output of the optocoupler 112 to determine the zero-crossings of the AC power received from the power source 10. For example, the leading and trailing edges of the square-wave represent zero-crossings of the AC power received from the power source 10.

It will be appreciated that in some example embodiments of the disclosed concept, the rectifiers 114,124 may be combined into a full-wave bridge rectifier. Since the secondary switch isolation circuit 120 and the zero-crossing isolation circuit 110 receive power from the NEUTRAL and LINE conductors, respectively, a full-wave bridge rectifier can provide each of the secondary switch isolation circuit 120 and the zero-crossing isolation circuit 110 with a half-wave rectified signal.

Figure 6A:
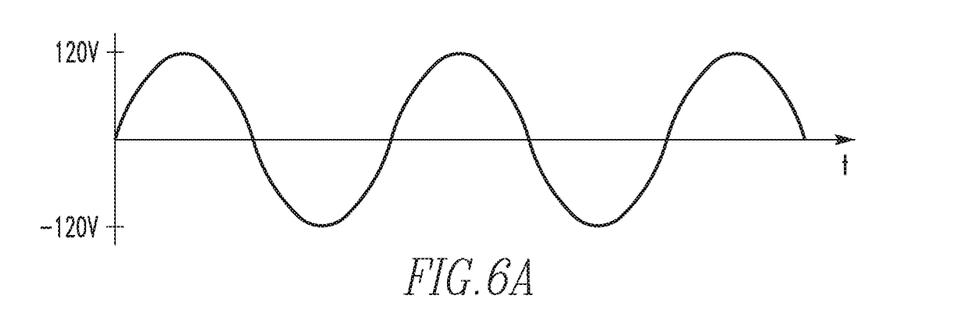
FIGS. 6A, 6B, and 6C are graphs illustrating signals associated with a zero-crossing isolation circuit in accordance with an example embodiment of the disclosed concept.
Figure 6B:
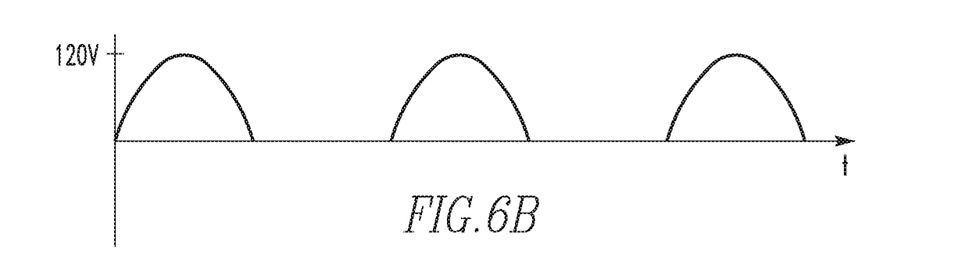
Figure 6C:
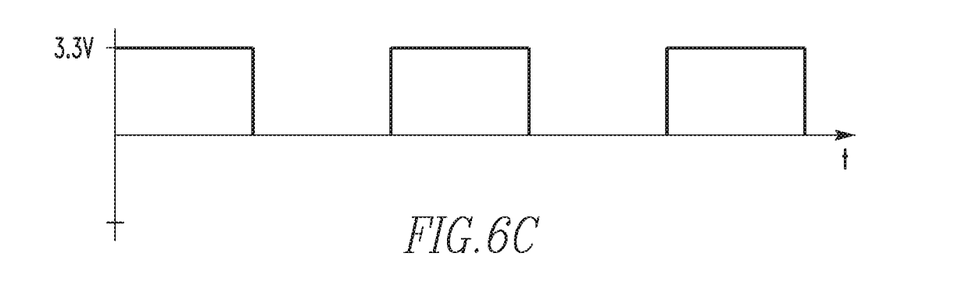

FIG. 6A is a chart illustrating the AC power received from the power source 10 in accordance with an example embodiment of the disclosed concept. FIG. 6B is a chart illustrating the half-wave AC signal received at the input of the optocoupler 112 after the AC power received from the power source 10 has been half-wave rectified. FIG. 6C is a chart illustrating an output of the optocoupler 112 in accordance with an example embodiment of the disclosed concept. As shown in FIGS. 6A, 6B, and 6C, the square-wave output by the optocoupler 112 corresponds to the half-wave rectified AC power received from the power source 10 and can be used to determine zero-crossings. Additionally, in some example embodiments of the disclosed concept, the AC power has a voltage of 120 Vac or 277 Vac while the square-wave output by the optocoupler 112 has a peak voltage of about 3.3V. While an example of power source 10 and square-wave voltages has been provided, it will be appreciated by those having ordinary skill in the art that any power source 10 voltage may be employed without departing from the scope of the disclosed concept. It will also be appreciated that any square-wave peak voltage usable by the processor 150 may be employed without departing from the scope of the disclosed concept. In some example embodiments of the disclosed concept, the square-wave peak voltage is based on DC power received from the power supply 130.

Referring to FIG. 7, an external view of the dimmer switch system including the dimmer switch 100 and the secondary switch housing 102 in accordance with an example embodiment of the disclosed concept is shown. As is shown in FIG. 7, the dimmer switch 100 has its own primary housing and the secondary housing 102 is a separate housing. In some example embodiments of the disclosed concept, the primary housing includes the primary switch 180, the processor 150, the secondary switch isolation circuit 120, and other components of the dimmer switch 100 while the secondary housing 102 includes the secondary switch 190.

The dimmer switch 100 in accordance with some example embodiments of the disclosed concept provides the additional functionality of being able to receive input from the secondary switch 190. The secondary switch 190 can be easily provided as an add-on to the dimmer switch 100. Similarly, in some example embodiments of the disclosed concept, the zero-crossing isolation circuit 110 provides the additional functionality of a zero-crossing signal usable by the processor 150 without interfering with other components of the dimmer switch 100. The zero-crossing isolation circuit 110 can, thus, also be easily provided as a modification to an existing dimmer switch.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A dimmer switch system electrically connected between a power source and a load, the dimmer switch system comprising:
    a primary housing including:
    a primary switch actuatable by a user;
    a processor structured to change a state of the dimmer switch based on actuation of either the primary switch or a secondary switch; and
    a secondary switch isolation circuit;
    a secondary housing including:
    the secondary switch actuatable by the user and being electrically connected to the power source,
    wherein the secondary switch isolation circuit is electrically connected between the secondary switch and the processor, the secondary switch isolation circuit including an optocoupler and being structured to isolate the processor from the power source and to provide a signal to the processor based on a state of the secondary switch.

2. The dimmer switch system of claim 1, wherein the signal provided to the processor has a high state when the secondary switch is closed and a low state when the secondary switch is opened.

3. The dimmer switch system of claim 2, wherein in the high state the signal provided to the processor is within a range of about 2.7V to about 3.3V and in the low state the signal provided to the processor is below 1V.

4. The dimmer switch system of claim 3, wherein the signal provided to the processor reaches the high state within less than 100 ms after the secondary switch is closed and the signal provided to the processor reaches the low state within less than 50 ms after the secondary switch is opened.

5. The dimmer switch system of claim 1, wherein the optocoupler includes an input electrically coupled to the power source and an output electrically coupled to the processor, and wherein the secondary switch isolation circuit includes a resistor and a capacitor electrically connected in series between the output of the optocoupler and ground.

6. The dimmer switch system of claim 5, wherein the resistor has a resistance of about 100Ω and the capacitor has a capacitance of about 10 μF.

7. The dimmer switch system of claim 1, further comprising:
    a power supply structured to convert alternating current from the power source to direct current power,
    wherein the optocoupler is structured to use the direct current power from the power supply.

8. The dimmer switch system of claim 1, wherein the dimmer switch is electrically connected to the power source via a line conductor and a neutral conductor, and wherein the secondary switch is electrically connected to the neutral conductor.

9. The dimmer switch system of claim 1, wherein the secondary switch isolation circuit is structured to receive alternating current power from the power source, and wherein the secondary switch isolation circuit includes a rectifier electrically coupled to an input of the optocoupler that is structured to half-wave rectify the alternating current power.

10. The dimmer switch system of claim 1, further comprising:
    a relay electrically connected between the power source and the load,
    wherein the processor is structured electrically control the relay to open and close, and
    wherein electrically controlling the relay to close changes the state of the dimmer switch to an on state and electrically controlling the relay to open changes the state of the dimmer switch to an off state.

11. The dimmer switch system of claim 1, further comprising:
    a dimmer mechanism operable by a user; and
    a dimmer control circuit structured to provide a dimming function based on operation of the dimmer mechanism.

12. The dimmer switch system of claim 1, further comprising:
    a zero-crossing isolation circuit including a second optocoupler and being structured to isolate the processor from the power source and to provide a zero-crossing signal to the processor based on power received from the power source.

13. The dimmer switch system of claim 12, wherein the zero-crossing isolation circuit is structured to receive alternating current power from the power source, and wherein the zero-crossing isolation circuit includes a rectifier electrically coupled to an input of the second optocoupler that is structured to half-wave rectify the alternating current power.

14. The dimmer switch system of claim 13, wherein the zero-crossing isolation circuit is structured to provide a square-wave corresponding to the half-wave rectified alternating current power.

15. The dimmer switch system of claim 14, wherein the square-wave has a peak value of about 3.3V.

16. A dimmer switch comprising:
a primary switch actuatable by a user;
an input structured to be electrically connected to a secondary switch actuatable by the user, the secondary switch being electrically connected to the power source;
a processor structured to change a state of the dimmer switch based on actuation of either the primary switch or the secondary switch; and
a secondary switch isolation circuit electrically connected between the secondary switch and the processor, the secondary switch isolation circuit including an optocoupler and being structured to isolate the processor from the power source and to provide a signal to the processor based on a state of the secondary switch.

17. The dimmer switch of claim 16, wherein the signal provided to the processor has a high state when the secondary switch is closed and a low state when the secondary switch is opened.

18. The dimmer switch of claim 17, wherein in the high state the signal provided to the processor is within a range of about 2.7V to about 3.3V and in the low state the signal provided to the processor is below 1V.

19. The dimmer switch of claim 16, wherein the optocoupler includes an input electrically coupled to the power source and an output electrically coupled to the processor, and wherein the secondary switch isolation circuit includes a resistor and a capacitor electrically connected in series between the output of the optocoupler and ground.

20. The dimmer switch of claim 16, wherein the dimmer switch further comprises:
a zero-crossing isolation circuit including a second optocoupler and being structured to isolate the processor from the power source and to provide a zero-crossing signal to the processor based on power received from the power source.

* * * * *